Patented Apr. 27, 1943

2,317,365

UNITED STATES PATENT OFFICE 2,317,365

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application July 11, 1941, Serial No. 401,973

11 Claims. (Cl. 260—152)

This invention relates to new monoazo dye compounds and their application for the coloration of textile materials in the form of threads, yarns, fibers and fabrics. Coloration can be effected by dyeing, printing, stenciling or like methods.

We have discovered that the azo compounds having the formula:

$$R-N=N-R_1$$

wherein R represents the residue of a benzene nucleus containing a nitro group in para position to the azo bond shown and a

group in ortho position to the azo bond shown and $R_1$ represents a member selected from the group consisting of a benzene nucleus containing an amino group in para position to the azo bond shown, a naphthalene nucleus containing an amino group in para position to the azo bond shown, a 1,2,3,4-tetrahydroquinoline nucleus joined through the carbon atom in its 6-position to the azo bond shown and a benzomorpholine nucleus joined through the carbon atom in its 6-position to the azo bond shown and wherein said amino groups and the nitrogen atom forming a part of the 1,2,3,4-tetrahydroquinoline and benzomorpholine nuclei are substituted with a member selected from the group consisting of an aliphatic group free of a carbon to phosphorus linkage, an aralkyl group and a cycloalkyl group, constitute a valuable class of dye compounds.

While our invention in its broadest aspect relates to the compounds above defined, it relates more particularly to the compounds having the formula:

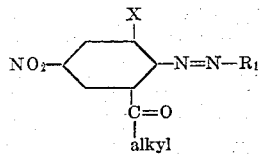

wherein X represents a member selected from the group consisting of hydrogen, a halogen atom, a nitro group, a hydroxy group and an alkoxy group and $R_1$ has the meaning above given.

Compounds of our invention, wherein the para-amino group of the benzene or naphthalene nucleus or the nuclear nitrogen atom of the 1,2,3,4-tetrahydroquinoline nucleus and the benzomorpholine nucleus are substituted with a hydroxyalkyl group, have been found to be particularly advantageous, and it is to this general class of compounds that our invention is primarily directed. Compounds having the formula:

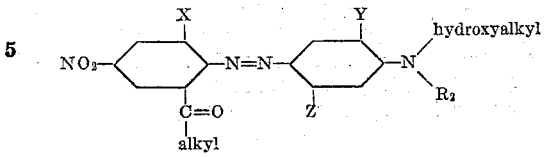

wherein X represents a member selected from the group consisting of hydrogen, a halogen atom, a nitro group, a hydroxy group and an alkoxy group, Y represents a member selected from the group consisting of hydrogen, a halogen atom, an alkyl group and an alkoxy group, Z represents a member selected from the group consisting of hydrogen, a halogen atom, an alkyl group, an alkoxy group and an acylamino group and $R_2$ represents a member selected from the group consisting of hydrogen, an unsubstituted alkyl group, a hydroxyalkyl group, an alkoxyalkyl group, a sulfoalkyl group and a sulfatoalkyl group appear to be advantageous as a class.

The compounds of our invention consitute valuable dyes for the coloration of organic derivative of cellulose, wool, silk, Nylon, and Vinyon textile materials. The nuclear non-sulfonated dye compounds are especially of value for the coloration of cellulose acetate silk but can be employed to color the other materials just named. Preferably no nuclear carboxylic acid group in either its free acid or salt form should be present when the dye compounds are to be used to color organic derivatives of cellulose. Compounds of our invention containing a nuclear sulfonic acid group in either its free acid or salt form have little or no utility for the dyeing of organic derivatives of cellulose but possess application for the dyeing of wool and silk. These sulfonated compounds can be prepared by sulfonation of the unsulfonated dye compounds in known fashion or by the use of a sulfonated component. Red, blue, blue-green, purple, and violet shades, for example, can be obtained employing the dye compounds described herein.

It is an object of our invention to provide a new class of monoazo dye compounds suitable for the coloration of organic derivatives of cellulose, wool, silk, Nylon and Vinyon. Another object of our invention is to provide a process for the coloration of organic derivatives of cellulose, wool, silk, Nylon and Vinyon. A further object is to provide colored textile materials which are of good fastness to light and washing. A particular object of our invention is to provide a new class of nuclear non-sulfonated monoazo dyes suitable for the coloration of cellulose acetate silk.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose and other textile materials such as those just mentioned.

The azo dye compounds of our invention for the most part possess superior light fastness properties. Further, they dye cellulose acetate silk rapidly and yield desirable shades thereon. To illustrate, our U. S. Patent No. 2,206,911, issued July 9, 1940, describes, for example, azo dye compounds having the formula:

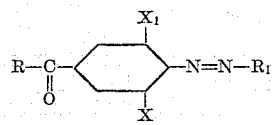

wherein R represents an alkyl group, X and X₁ each represent a member selected from the group consisting of a univalent aliphatic radical, a nitro group and a halogen atom and R₁ represents a member selected from the group consisting of an aryl group of the benzene and naphthalene series, a hydroaromatic nucleus and a heterocyclic nucleus. While the azo dye compounds described in said patent yield dyeings on cellulose acetate silk which are of good light fastness, as stated, the dye compounds of our present invention yield dyeings on cellulose acetate silk which have markedly improved light fastness. Again, the dye compounds of our present invention dye cellulose acetate silk more speedily than those described in said patent.

The superiority of the dye compounds of our present invention over the dye compounds of our U. S. Patent No. 2,206,911 was not to be expected. The discovery of these superior dye compounds was made by us only after careful and extensive investigation of monoazo dye compounds prepared from phenyl alkylketone components. Their discovery is believed to constitute a definite contribution to the art.

The azo dye compounds of our invention can be prepared by diazotizing aminobenzenes containing a nitro group in para position to the free amino group and an alkylketo group in ortho position to said free amino group and coupling the diazonium compounds obtained with an aminobenzene or α-naphthylamine compound in which the amino group is substituted with a member selected from the group consisting of an aliphatic group free of a carbon to phosphorus linkage, an aralkyl group and a cycloalkyl group and with 1,2,3,4-tetrahydroquinoline and benzomorpholine compounds in which the nitrogen atom forming a part of the nucleus is similarly substituted as the amino group just mentioned.

The following examples illustrate the preparation of the azo dye compounds of our invention:

EXAMPLE 1

A. 7.6 grams of powdered sodium nitrite are dissolved in 53 cc. (97.5 grams) of cold concentrated sulfuric acid. After the addition, the solution is warmed to a temperature not exceeding 70° C. following which it is cooled to a temperature of 10–15° C.

B. 0.1 gram mole of 2-amino-5-nitrophenylmethyl ketone are dissolved in 220 cc. of hot glacial acetic acid and following solution of the amine compound the hot acetic acid solution is rapidly cooled to room temperature.

The mixture prepared in B is added to solution A over a period of 30 minutes while maintaining a temperature of 10–15° C. Following this addition, the resulting solution is stirred for one hour or more and then 1 gram of urea is added to remove any excess nitrous acid. The diazotization reaction just described is known as diazotization by means of nitrosyl sulfuric acid in acetic acid.

0.1 gram mole of di-β-hydroxyethylaniline is dissolved in an iced hydrochloric acid solution and the diazonium solution prepared as described above is added with stirring while maintaining the reaction mixture in a cooled condition. The coupling reaction which takes place is completed by adding sodium carbonate until the reaction mixture is just neutral to Congo red paper. The dye compound formed is recovered by filtration, washed with water and dried. Cellulose acetate silk is colored rubine shades from an aqueous suspension of the dye compound thus obtained.

EXAMPLE 2

0.1 gram mole of 2-amino-5-nitrophenylmethyl ketone is diazotized as described in Example 1 and the diazonium compound obtained is coupled with 0.1 gram mole of 1-β,γ-dihydroxypropylaminonaphthalene. Coupling and recovery of the dye compound formed can be carried out in accordance with the general procedure described in Example 1. The dye compound obtained colors cellulose acetate silk violet.

EXAMPLE 3

0.1 gram mole of 2-amino-5-nitrophenylmethyl ketone is diazotized in accordance with the method described in Example 1 and the diazonium compound obtained is coupled with 0.1 gram mole of (ethyl-β,γ - dihydroxypropyl) - aminobenzene. Coupling and recovery of the dye compound formed can be carried out in accordance with the general procedure described in Example 1. The dye compound obtained colors cellulose acetate silk rubine.

EXAMPLE 4

0.1 gram mole of 2-amino-3,5-dinitrophenylmethyl ketone is diazotized in accordance with the method described in Example 1 and the diazonium compound obtained is coupled with 0.1 gram mole of N - β,γ - dihydroxypropyl - 2,7 - dimethyltetrahydroquinoline. Coupling and recovery of the dye compound formed can be carried out in accordance with the general procedure described in Example 1. The dye compound obtained colors cellulose acetate silk blue.

EXAMPLE 5

0.1 gram of 2-amino-5-nitrophenylmethyl ketone is diazotized as described in Example 1 and the diazonium compound obtained is coupled with 0.1 gram mole of N-β,γ-dihydroxypropyl-2,7-dimethyltetrahydroquinoline. Coupling and recovery of the dye compound formed can be carried out in accordance with the general procedure described in Example 1. The dye compound obtained colors cellulose acetate silk violet.

EXAMPLE 6

0.1 gram mole of 2-amino-3-chloro-5-nitrophenylethylketone is diazotized in accordance with the method described in Example 1 and the diazonium compound obtained is coupled with 0.1 gram mole of 1-β-hydroxyethylamino-5-naphthol. Coupling and recovery of the dye compound formed can be carried out in accordance with the general procedure described in Example 1. The dye compound obtained colors cellulose acetate silk blue.

EXAMPLE 7

0.1 gram mole of 2-amino-3-hydroxy-5-nitrophenylmethyl ketone is diazotized in accordance with the method described in Example 1 and the diazonium compound obtained is coupled with 0.1 gram mole of 1-di-β-hydroxyethylamino-3-methylbenzene. Coupling and recovery of the dye compound formed can be carried out in accordance with the general procedure described in Example 1. The dye compound obtained colors cellulose acetate silk magenta-like shades.

EXAMPLE 8

0.1 gram mole of 2-amino-3-methoxy-5-nitrophenylmethyl ketone is diazotized in accordance with the method described in Example 1 and the diazonium compound obtained is coupled with 0.1 gram mole of benzylaniline. Coupling and recovery of the dye compound formed can be carried out in accordance with the general procedure described in Example 1. The dye compound obtained colors cellulose acetate silk rubine.

EXAMPLE 9

0.1 gram mole of 2-amino-3-bromo-5-nitrophenylmethyl ketone is diazotized in accordance with the method described in Example 1 and the diazonium compound obtained is coupled with 0.1 gram mole of cyclohexylaniline. Coupling and recovery of the dye compound formed can be carried out in accordance with the general procedure described in Example 1. The dye compound obtained colors cellulose acetate silk rubine.

The following tabulation further illustrates the compounds included within the scope of our invention together with the color they produce on cellulose acetate silk. The compounds indicated below may be prepared by diazotizing the amines listed under the heading "Amine" and coupling the diazonium compound obtained with the compounds specified in the column entitled "Coupling component." The diazotization and coupling reactions may, for example, be carried out following the general procedure described in Examples 1–9, inclusive.

| Amine | Coupling component | Color |
|---|---|---|
| 2-amino-5-nitrophenylmethyl-ketone. | (1) 1 - di - β - hydroxyethylamino-3-methylbenzene. | Rubine. |
| Do | (2) 1 - di - β - hydroxyethylamino - 2 - methoxy-5-methylbenzene. | Violet. |
| Do | (3) 1-β, γ-dihydroxypropylamino - 2 - methylbenzene. | Rubine. |
| Do | (4) 1 - β - hydroxyethylamino-5-naphthol. | Blue. |
| Do | (5) N - β, γ - dihydroxypropyl - 7 - methyltetrahydroquinoline. | Rubine. |
| Do | (6) 1 - hydroxy - 2 - di - β - hydroxy-ethylamino - 4 - acetaminobenzene. | Reddish-blue. |
| Do | (7) 1-β, γ-dihydroxypropylamino - 2 - chlorobenzene. | Red. |
| Do | (8) 1-β-hydroxypropylamino - 2 - methoxy-5-methylbenzene. | Rubine. |
| 2-amino-5-nitrophenyl-methyl-ketone—Cont'd. | (9) 1 - di - β - hydroxyethylamino-2-methoxy - 5 - acetaminobenzene. | Reddish-blue. |
| Do | (10) 1-(ethyl-, β, γ-dihydroxypropyl-) amino - 3 - methyl - benzene. | Rubine. |
| Do | (11) 1-(butyl-, sodium-β-sulfoethyl-) amino-3-methylbenzene. | Do. |
| Do | (12) 1-β-hydroxyethylamino-2-methylbenzene. | Do. |
| Do | (13) 1-allylamino - 3 - chlorobenzene. | Red. |
| Do | (14) 1 - crotonylamino - 2 - methoxy - benzene. | Rubine. |
| Do | (15) N - β - hydroxyethyl-2-methylbenzomorpholine. | Do. |
| Do | (16) N - β, γ - dihydroxypropyl - 7 - methylbenzomorpholine. | Do. |
| Do | (17) N - allyl-2, 7-dimethyl - benzomorpholine. | Violet. |
| Do | (18) N - β - hydroxyethyltetrahydro - quinoline. | Rubine. |
| Do | (19) N - β - hydroxypropyltetrahydroquinoline. | Do. |
| Do | (20) N-β, γ-dihydroxypropyl - 2 - methyltetrahydroquinoline. | Do. |
| Do | (21) N - β, γ - dihydroxypropyl-2-methyl-7 - chlorotetrahydroquinoline. | Reddish-rubine. |
| Do | (22) N - pentaerythritol-2, 7 - dimethyltetrahydroquinoline. | Rubine. |
| Do | (23) 1 - crotonylamino - 5 - naphthol. | Blue. |
| Do | (24) 1 - (propyl-, β-hydroxyethyl-) aminonaphthalene. | Violet. |
| Do | (25) 1-γ-hydroxypropylamino-naphthalene. | Do. |
| Do | (26) 1 - β - hydroxyethylamino - 5, 8 - dihydroxynaphthalene. | Blue. |
| Do | (27) 1 - β, γ - dihydroxypropylaminonaphthalene. | Violet. |
| Do | (28) N - β, γ - dihydroxypropyl-2, 7-dimethyltetrahydroquinoline. | Do. |
| Do | (29) 1 - β, γ - dihydroxypropylamino - 5 - naphthol. | Blue. |
| Do | (30) 1- (β - methoxyethyl-, β - hydroxyethyl -) amino - 3 - methylbenzene. | Rubine. |
| Do | (31) (β - hydroxyethyl-, β-sulfoethyl-) aminobenzene. | Do. |
| Do | (32) 1 - (γ - hydroxypropyl-, β-sulfatoethyl-) amino-3-chlorobenzene. | Reddish-blue. |
| Do | (33) 1 - (β - phosphatoethyl-, β - hydroxyethyl -) amino - 2 - methoxy-5 - methylbenzene. | Violet. |
| 2-amino-5-nitrophenylethyl ketone. | Coupling components 1–33 | Red to blue. |
| 2-amino-3-hydroxy-5-nitrophenylmethyl ketone. | do | Pinkish-red to blue. |
| 2-amino-3, 5-dinitrophenylmethyl ketone. | do | Rubine to green-blue. |
| 2-amino-3-chloro-5-nitrophenylmethyl ketone. | do | Rubine to blue. |
| 2-amino-3-methoxy-5-nitrophenylmethyl ketone. | do | Do. |
| 2-amino-5-nitrophenylpropyl ketone. | do | Do. |
| 2-amino-3, 5-dinitrophenylbutyl ketone. | do | Rubine to green-blue. |
| 2-amino-3-bromo-5-nitrophenylmethyl ketone. | do | Rubine to blue. |
| 2-amino-3-ethoxy-5-nitrophenylmethyl ketone. | do | Do. |
| 2-amino-3, 5-dinitrophenylethyl ketone. | do | Rubine to green-blue. |

It will be understood that any of the 2-amino-5-nitrophenylalkylketones disclosed herein can be diazotized and the diazonium compounds obtained coupled with any of the coupling components disclosed herein to obtain dye compounds of our invention. Sulfonated coupling components that can be employed to obtain dye compounds suitable for the coloration of wool and silk include, for example, 1-β,γ-dihydroxypropylamino-3-sulfonicbenzene, 1-β-hydroxyethylamino-3-sulfonicbenzene, 1-β,γ-dihydroxypropylamino-2-sulfonicnaphthalene, 1-β-hydroxyethylamino-8-sulfonicnaphthalene, 1-(ethyl-, β-hydroxypropyl-)amino-3-sulfonicbenzene, 1-(ethyl-, β-hydroxyethyl-)amino-5-sulfonicnaphthalene and 1-γ-hydroxypropylamino-3-sulfonicbenzene.

In order that the preparation of the dye compounds of our invention may be clearly understood, the preparation of various 2-amino-5-nitrophenylalkylketones is described or indicated hereinafter.

*Preparation of 2 - amino - 5-nitrophenylmethylketone*

This compound is shown in Berichte der Deutschen Chemischen Gesellschaft, vol. 48 at page 563. Its preparation is described in the accompanying article.

*Preparation of 2-amino-3-chloro-5-nitrophenylmethylketone*

This compound is disclosed in Berichte der Deutschen Chemischen Gesellschaft, vol. 48 at page 573. Its preparation is described in the accompanying article.

*Preparation of 2-amino-3,5-dinitrophenylethylketone*

1 gram mole of 2-chloro-3,5-dinitrophenylethylketone is dissolved in ethyl alcohol and the reaction mixture is heated to boiling under reflux. Ammonia gas is then passed into the reaction mixture until no further deepening in color is obtained. The desired product is precipitated by pouring the reaction mixture into water after which it is recovered by filtration, washed with water and dried.

2-chloro-3,5-dinitrophenylethylketone can be prepared by nitrating 2-chlorophenylethyl ketone in 10% oleum with fuming nitric acid. The desired product is precipitated by pouring the reaction mixture into water following which it may be recovered by filtration. The compound thus obtained may be further purified by crystallization from ethyl alcohol.

2-chlorophenyl ethyl ketone used in the above preparation is prepared by the following operations. (a) Phenylethyl ketone is nitrated at 10° C. and the ortho-isomer is separated from the reaction products by fractional crystallization. (b) The 2-nitrophenylethyl ketone thus prepared is reduced with tin and hydrochloric acid following which the 2-aminophenylethyl ketone formed is diazotized. (c) The diazonium compound formed by the diazotization reaction is then treated with cuprous chloride to give 2-chlorophenylethyl ketone the desired compound.

*Preparation of 2-amino-3,5-dinitrophenylbutylketone*

This compound can be prepared similarly as 2-amino-3,5-dinitrophenylethylketone by substituting the corresponding phenylbutyl ketone compounds for the phenylethyl ketone compounds in the procedure described for obtaining 2-amino-3,5-dinitrophenylethylketone.

*Preparation of 2-amino-3-hydroxy-5-nitrophenylmethylketone*

The above compound can be prepared by heating 1 gram mole of 2-chloro-3-hydroxy-5-nitrophenylmethylketone in an autoclave with 5 gram moles of aqueous ammonia (28%) for 8 hours. Following this treatment with ammonia the reaction mixture is permitted to cool and the 2-amino-3-hydroxy-5-nitrophenylmethylketone is recovered by filtration and dried.

2 - chloro - 3-hydroxy-5-nitrophenylmethylketone is prepared by the following reactions. (a) 2 - chloro - 3,5 - dinitrophenylmethylketone is reduced with ammonium sulfide to 2-chloro-3-amino-5-nitrophenylmethylketone and the amine thus obtained is diazotized in known fashion. (b) The diazonium compound prepared in (a) is heated in water to form 2-chloro-3-hydroxy-5-nitrophenylmethylketone the desired compound.

*Preparation of 2-amino-3-methoxy-5-nitrophenylmethylketone*

1 gram mole of 2-hydroxy-3-methoxy-5-nitrophenylmethylketone is heated at 160° C. in an autoclave for 12 hours with aqueous ammonia. Following this heating the reaction mixture is permitted to cool and 2-amino-3-methoxy-5-nitrophenylmethylketone crystallizes therefrom and is recovered by filtration, washed with water and dried. This compound can be purified by crystallization from acetic acid.

2-hydroxy-3-methoxy-4-nitrophenylmethylketone is prepared by heating 2-methoxy-4-nitrophenol in carbon disulfide with aluminum chloride and acetic anhydride. The reaction mixture is poured into water and the precipitated 2-hydroxy-3-methoxy-5-nitrophenylmethylketone is recovered by filtration. This compound may be further purified by crystallization from ethyl alcohol.

*Preparation of 2-amino-3-bromo-5-nitrophenylmethylketone*

1 gram mole of 2-amino-5-nitrophenylmethylketone is dissolved in acetic acid and 1 gram mole of bromine is slowly added thereto while maintaining the reaction mixture in a cooled condition. After reaction is complete the reaction mixture is poured into water and filtered. The 2-amino-3-bromo - 5 - nitrophenylmethylketone obtained as a precipitate can be purified by crystallization from either ethyl alcohol or acetic acid.

The azo dye compounds of our invention are, for the most part, relatively insoluble in water. Those compounds which are insoluble in water may be advantageously employed for the direct dyeing of the textile materials named herein by grinding the dye to a fine powder intimately mixing it with a suitable dispersing or solubilizing agent and adding the resulting mixture to water or a dilute solution of soap in water to form an aqueous dye bath. Following this known preparation of the dye bath, the textile material to be dyed may be added thereto and the dyeing operation conducted at a temperature of 70–80° C., for example, in known fashion. The dye compounds of our invention which are water soluble do not require the use of a dispersing or solubilizing agent (however, such an agent may be employed if desired) but may be applied to silk, wool, and (depending upon the nature and position of the water solubilizing group) organic derivatives of cellulose textile materials from an aqueous solution of the dye which may contain a salt such as sodium chloride. For a more complete description as to how the water insoluble azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of silk and wool or mixtures of these, reference may be had to our U. S. Letters Patent 2,107,898, issued February 8, 1938.

It is here noted that the term alkyl used in connection with the alkyl ketone group present in the compounds of our invention refers to an unsubstituted alkyl group. Normally this alkyl group will be a low carbon alkyl group such as methyl, ethyl, propyl or butyl, for example.

We claim:

1. The azo dye compounds having the formula:

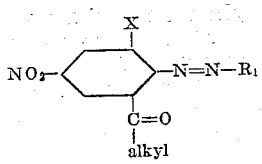

wherein X represents a member selected from the group consisting of hydrogen, a halogen atom, a nitro group, a hydroxy group and an alkoxy group and $R_1$ represents a member selected from the group consisting of a benzene nucleus containing an amino group in para position to the azo bond shown, a naphthalene nucleus containing an amino group in para position to the azo bond shown, a 1,2,3,4-tetrahydroquinoline nucleus joined through the carbon atom in its 6 position to the azo bond shown and a benzomorpholine nucleus joined through the carbon atom in its 6 position to the azo bond shown and wherein said amino groups and the nitrogen atom forming a part of the 1,2,3,4-tetrahydroquinoline and benzomorpholine nuclei are substituted with a member selected from the group consisting of an aliphatic group free of a carbon to phosphorus linkage, an aralkyl group and a cycloalkyl group.

2. The azo dye compounds having the formula:

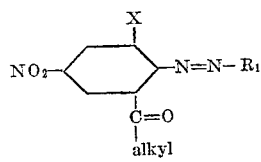

wherein X represents a member selected from the group consisting of hydrogen, a halogen atom, a nitro group, a hydroxy group and an alkoxy group and $R_1$ represents a member selected from the group consisting of a benzene nucleus containing an amino group in para position to the azo bond shown, a naphthalene nucleus containing an amino group in para position to the azo bond shown, a 1,2,3,4-tetrahydroquinoline nucleus joined through the carbon atom in its 6 position to the azo bond shown and a benzomorpholine nucleus joined through the carbon atom in its 6 position to the azo bond shown, said amino groups and the nitrogen atom forming a part of the 1,2,3,4-tetrahydroquinoline and benzomorpholine nuclei being substituted with a hydroxyalkyl group and wherein said amino groups are free of any aliphatic group containing a carbon to phosphorus linkage.

3. The azo dye compounds having the formula:

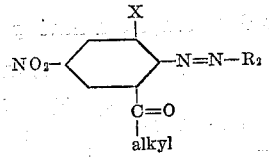

wherein X represents a member selected from the group consisting of hydrogen, a halogen atom, a nitro group, a hydroxy group and an alkoxy group and $R_2$ represents a benzene nucleus containing an amino group substituted with a hydroxyalkyl group in para position to the azo bond shown and wherein said amino group is free of any aliphatic group containing a carbon to phosphorus linkage.

4. The azo dye compounds having the formula:

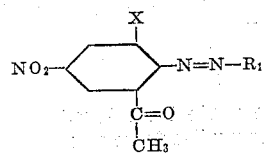

wherein X represents a member selected from the group consisting of hydrogen, a halogen atom, a nitro group, a hydroxy group and an alkoxy group and $R_1$ represents a member selected from the group consisting of a benzene nucleus containing an amino group in para position to the azo bond shown, a naphthalene nucleus containing an amino group in para position to the azo bond shown, a 1,2,3,4-tetrahydroquinoline nucleus joined through the carbon atom in its 6 position to the azo bond shown and a benzomorpholine nucleus joined through the carbon atom in its 6 position to the azo bond shown, and wherein said amino groups and the nitrogen atom forming a part of the 1,2,3,4-tetrahydroquinoline and benzomorpholine nuclei are substituted with a member selected from the group consisting of an aliphatic group free of a carbon to phosphorus linkage, an aralkyl group and a cycloalkyl group.

5. The azo dye compounds having the formula:

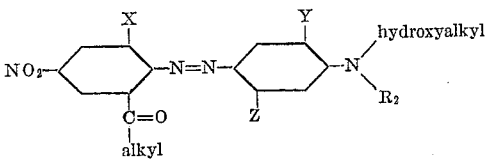

wherein X represents a member selected from the group consisting of hydrogen, a halogen atom, a nitro group, a hydroxy group and an alkoxy group, Y represents a member selected from the group consisting of hydrogen, a halogen atom, an alkyl group and an alkoxy group, Z represents a member selected from the group consisting of hydrogen, a halogen atom, an alkyl group, an alkoxy group and an acylamino group and $R_2$ represents a member selected from the group consisting of hydrogen, an unsubstituted alkyl group, a hydroxyalkyl group, an alkoxyalkyl group, a sulfoalkyl group and a sulfatoalkyl group.

6. The azo dye compound having the formula:

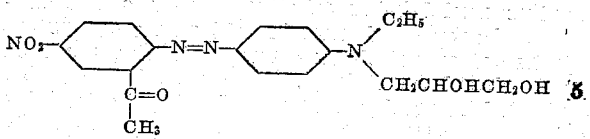

7. The azo dye compound having the formula:

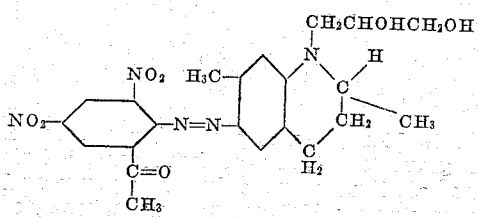

8. The azo dye compound having the formula:

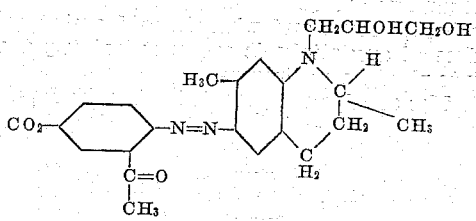

9. A textile material colored with an azo dye compound having the formula:

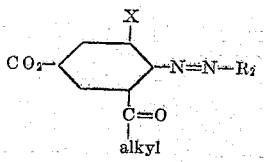

wherein X represents a member selected from the group consisting of hydrogen, a halogen atom, a nitro group, a hydroxy group and an alkoxy group and $R_1$ represents a benzene nucleus containing an amino group substituted with a hydroxyalkyl group in para position to the azo bond shown and wherein said amino group is free of any aliphatic group containing a carbon to phosphorus linkage.

10. A cellulose acetate colored with a nuclear non-sulfonated azo dye compound having the formula:

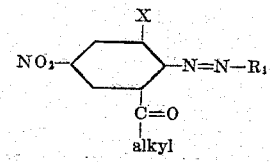

wherein X represents a member selected from the group consisting of hydrogen, a halogen atom, a nitro group, a hydroxy group and an alkoxy group and $R_1$ represents a member selected from the group consisting of a benzene nucleus containing an amino group in para position to the azo bond shown, a naphthalene nucleus containing an amino group in para position to the azo bond shown, a 1,2,3,4-tetrahydroquinoline nucleus joined through the carbon atom in its 6 position to the azo bond shown and a benzomorpholine nucleus joined through the carbon atom in its 6 position to the azo bond shown and wherein said amino groups and the nitrogen atom forming a part of the 1,2,3,4-tetrahydroquinoline and benzomorpholine nuclei are substituted with a member selected from the group consisting of an aliphatic group free of a carbon to phosphorus linkage, an aralkyl group and a cycloalkyl group.

11. A cellulose acetate colored with a nuclear non-sulfonated azo dye compound having the formula:

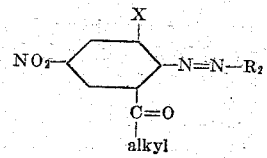

wherein X represents a member selected from the group consisting of hydrogen, a halogen atom, a nitro group, a hydroxy group and an alkoxy group and $R_1$ represents a benzene nucleus containing an amino group substituted with a hydroxyalkyl group in para position to the azo bond shown and wherein said amino group is free of any aliphatic group containing a carbon to phosphorus linkage.

JOSEPH B. DICKEY.
JAMES G. McNALLY.

CERTIFICATE OF CORRECTION.

Patent No. 2,317,365.  April 27, 1943.

JOSEPH B. DICKEY, ET AL.

It is hereby certified that error appears in the printed specification of the above numbered patent requiring correction as follows: Page 6, first column, lines 25 and 35, claims 8 and 9 respectively, in the first portion of the formula, for "$CO_2$" read --$NO_2$--; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.